United States Patent [19]
Jones, Jr.

[11] Patent Number: 5,520,723
[45] Date of Patent: May 28, 1996

[54] METHOD AND SYSTEM FOR REDUCING AIR POLLUTION FROM NATURAL GAS DEHYDRATORS

[76] Inventor: Robert A. Jones, Jr., 3115 Lake Vista Cir., Tyler, Tex. 75707

[21] Appl. No.: 389,159

[22] Filed: Feb. 15, 1995

[51] Int. Cl.⁶ .............................. B01D 19/00; B01D 53/14
[52] U.S. Cl. .............................. 95/161; 95/163; 95/184; 95/191; 95/194; 95/231; 95/237; 55/222; 55/233; 55/269; 96/181; 96/185; 96/201; 96/218
[58] Field of Search .............................. 55/222, 233, 238, 55/257.1, 257.7; 95/156, 158–169, 174, 177, 179, 184, 187, 191, 193, 194, 209, 227, 228, 231, 237; 96/155, 181, 185, 201, 218

[56] References Cited

U.S. PATENT DOCUMENTS

| | | | |
|---|---|---|---|
| Re. 25,504 | 12/1963 | Glasgow | 96/185 X |
| 3,105,748 | 10/1963 | Stahl | 95/191 |
| 3,182,434 | 5/1965 | Fryar | 95/161 |
| 3,318,071 | 5/1967 | Sinex | 95/191 |
| 3,362,891 | 1/1968 | Meyers | 95/166 X |
| 3,855,337 | 12/1974 | Foral, Jr. et al. | 95/191 |
| 3,918,934 | 11/1975 | Kriebel et al. | 95/191 X |
| 4,005,997 | 2/1977 | Fowler et al. | 95/194 X |
| 4,084,944 | 4/1978 | Chirico | 96/218 X |
| 4,182,659 | 1/1980 | Anwer et al. | 203/18 |
| 4,273,620 | 6/1981 | Knobel | 95/191 X |
| 4,280,867 | 7/1981 | Hodgson | 95/191 X |
| 4,314,891 | 2/1982 | Knobel | 203/18 |
| 4,484,983 | 11/1984 | Bannon | 203/42 |
| 4,484,984 | 11/1984 | Bannon | 203/42 |
| 4,484,985 | 11/1984 | Bannon | 203/42 |
| 4,484,986 | 11/1984 | Bannon | 203/42 |
| 4,701,188 | 10/1987 | Mims | 95/209 X |
| 4,708,721 | 11/1987 | Ehrler | 96/181 X |
| 5,141,536 | 8/1992 | Schievelbein et al. | 55/208 |
| 5,163,981 | 11/1992 | Choi | 95/209 |
| 5,167,675 | 12/1992 | Rhodes | 96/181 X |
| 5,209,762 | 5/1993 | Lowell | 55/31 |
| 5,259,931 | 11/1993 | Fox | 202/83 |
| 5,346,537 | 9/1994 | Lowell | 95/161 |

*Primary Examiner*—Robert Spitzer
*Attorney, Agent, or Firm*—Richard C. Litman

[57] ABSTRACT

A method and system for reducing emissions from glycol dehydrators which employ a vapor-liquid contactor operated under ambient conditions to treat the organic vapors and liquids exiting from a condenser attached to the vapor vent of the glycol reboiler. A stream of the organic liquids is passed to the top of the contactor and allowed to descend in counter-current relation to the upward moving gas introduced at the bottom portion of the contactor. Liquids containing a relatively high content of hydrocarbons may be recovered from the bottom of the contactor, and vapors having a reduced content of organic emissions can be emitted directly to the atmosphere from the top the contactor.

12 Claims, 3 Drawing Sheets

METHOD AND SYSTEM FOR REDUCING AIR POLLUTION FROM NATURAL GAS DEHYDRATORS

BACKGROUND OF THE INVENTION

1. Field of the Invention

The present invention relates to a process and apparatus for controlling harmful organic emissions from waste gas vent streams. More particularly, this invention relates to a method and system for reducing emissions of volatile organic compounds and hazardous air pollutants from natural gas dehydrators.

2. Description of the Prior Art

Processing of natural gas includes the removal of water and other contaminants to provide a uniformly dry gas for industrial and consumer use. It is essential that water from produced natural gas streams be removed to prevent ice formation and corrosion in gas pipelines, valves, and fittings. The most widely used water removal or dehydration units in the natural gas industry are those based on water absorption by ethylene glycol, diethylene glycol or triethylene glycol.

Glycol dehydration systems have been the subject of prior patents such as U.S. Pat. Nos. 4,182,659 and 4,314,891. As described therein, these dehydrators basically include an absorption column, a pump to move the glycol through the system, and a glycol reboiler to regenerate the glycol. Most such systems also employ a three-phase condensate separator to recover some of the immiscible hydrocarbons from the glycol prior to drying the glycol in the glycol reboiler. In the absorption column, the wet gas stream contacts glycol in a countercurrent manner, wherein water and various hydrocarbon impurities are absorbed by the glycol. The water-containing glycol solutions then pass to the glycol reboiler or regenerator, where the greater part of the water is vaporized in the form of steam and separated. A still column is usually located on top of the reboiler to separate the water and glycol. A reflux coil or other reflux mechanisms may be utilized to condense vapor in the still column. Concentrated glycol having a low water content is then recovered and recycled for further use in drying the gas.

Emissions consisting largely of water vapor are vented to the atmosphere from the still column of the glycol reboiler. These emissions also contain toxic compounds such as benzene, toluene, ethylbenzene, and xylenes (hereinafter referred to as "BTEX") and other volatile organic compounds ("VOC's"), all of which serve as a source of air pollution in the absence of any control system to recover or destroy these organic species. In fact, the 1990 Clean Act Amendments enumerated a number of these species as being "Hazardous Air Pollutants" and prescribed certain levels for their control. This recent legislation alerted the oil and gas industry to a previously unrecognized problem regarding emissions to the air from systems designed to remove water from natural gas streams.

Various control systems have been tried by the natural gas industry for the purpose of minimizing organic emissions from glycol dehydrators in compliance with air pollution laws. The most common systems utilize heat exchangers to condense and recover some of the VOC's. These condensers often use air as the cooling medium, since glycol dehydrators are frequently located in remote areas having no available cooling water. Condensers installed in the past were usually not designed such that they can comply with the requirements of the 1990 Clean Air Act Amendments. Additionally, thermal and catalytic incineration techniques have been considered by the industry as solutions to the pollution problem associated with organic emissions, but were found to be too costly to implement and fraught with technical and safety problems. Moreover, incineration wastes a valuable hydrocarbon resource and adds undesirable carbon dioxide to the atmosphere without producing any commensurate benefits.

The primary systems presently used in the industry to control emissions of the forgoing type are tubular air and/or water-cooled condensers. These condensers produce a vent gas, an organic liquid phase, and a water phase. While these systems substantially reduce BTEX emissions, a significant amount of valuable hydrocarbons continue to be annually emitted to the atmosphere. Moreover, a highly contaminated water stream is produced by such control systems, which may require treatment prior to use or disposal.

U.S. Pat. Nos. 5,209,762 and 5,346,537 to Lowell disclose improvements in conventional glycol dehydration systems which enables control of emissions of volatile organic compounds, while minimizing the contaminants in the water streams produced. In U.S. Pat. No. 5,209,762, vented steam and gaseous VOC's from the glycol regenerator are flowed as input to the bottom of a BTEX steam stripper column, and vapors from the top of the steam stripper column are flowed to a cooling condenser to produce a water stream having a relatively high content of organic compounds. The water stream is passed to the top of the steam stripper and then through the stripper in counter-current relation to the vented gases and steam, whereby a stripped water stream having a low content of organics emerges from the bottom of the stripper column. While this system is effective for its intended purposes, it is technologically complex and relatively costly to implement.

In U.S. Pat. No. 5,346,537, a simplified modification of the aforementioned system is described in which the BTEX steam stripper is eliminated. This simplified system relies on a cooling tower to air strip organics from the condenser water stream. Vented steam and volatile organics from the glycol reboiler are input to an air-cooled condenser and a downstream water-cooled condenser connected in series to produce a condensed water stream having dissolved organic compounds, an organic vent gas, and an organic liquid. These phases are separated in an accumulator. The condensed water stream is passed through a cooling tower in counter-current relation to stripping air, whereby a stripped water stream having a low content of organics emerges from the tower. Like the system described in U.S. Pat. No. 5,209,762, this modified system is complex, costly, and emits to the air the VOC's stripped from the water.

U.S. Pat. No. 5,141,536 describes a glycol dehydration apparatus having a shell-and-tube countercurrent condenser attached to the water vapor vent to condense volatile carbon compounds. The shell-and-tube condenser has an interior tube with an inlet and outlet for passage of the gaseous fluid, and a shell having an inlet and outlet for passage of wet glycol through an annular space between the shell and tube. While BTEX recovery efficiency of this patented apparatus is reportedly high, all the hydrocarbons existing in the vapor vent of the glycol reboiler may not be condensed in some cases, and vapors leaving the atmospheric vent downstream of the condenser are undesirably emitted to the environment.

SUMMARY OF THE INVENTION

It is accordingly a primary object of the present invention to provide a simplified method and system for effectively reducing emissions of volatile organic compounds and hazardous air pollutants from natural gas dehydrators.

It is a further object of the invention to provide an improved glycol dehydration system for drying natural gas which fully meets current air pollution requirements pertaining to BTEX and VOC emissions.

It is among the additional objects of the present invention to provide a cost effective method and apparatus for drying natural gas with a glycol which provides for substantially complete recovery of useful hydrocarbon products, and significant reduction of volatile organic emissions which may otherwise be released into the atmosphere as pollutants.

These and other objects are accomplished in accordance with the present invention which provides a method and system for reducing emissions from glycol dehydrators which employ a vapor/liquid contactor operated under ambient conditions to treat the multicomponent organic vapors and liquids exiting from a condenser attached to the vapor vent of the glycol reboiler. Pursuant to the present invention, water vapor and volatile organic components from the glycol reboiler are flowed to an air-cooled condenser to produce a water phase, an organic gas, and an organic liquid phase. The gas phase, which is generally not in equilibrium with the total condensed liquids exiting the condenser, is then passed through the contactor in counter-current relation to the liquids, whereby a substantial portion of the hydrocarbon components in the gas are absorbed by the liquid phase, while the hydrocarbon species of the liquid phases are vaporized to a lesser degree. This relatively simple operation is capable of recovering up to seventy percent of VOC's in the gas stream leaving the non-equilibrium condenser, while the vented vapor is discharged to the atmosphere. The VOC content of the vented vapors is thereby substantially reduced, especially the amount of highly hazardous benzene.

In a preferred embodiment of the present invention, the vapor, water phase and organic liquid phase leaving the air-cooled condenser are passed to a vapor-liquid separator prior to flowing the separated gas and liquid phases to the contactor. The separator may consist of a section of pipe connected to the condenser outlet. The preferred condenser is a helically fined pipe having a relatively small diameter which is cooled by natural circulation of ambient air. The gas-liquid contactor preferably consists of a small diameter column containing packing material to provide intimate contact between the gas and liquid phases. The organic liquid phase and the water phase are passed to the top of the packed column and preferably allowed to descend by gravity in counter-current relation to the upward moving gas. This results in intimate contact of the gas and liquids, and the atmospheric emission of vapor phase VOC's, especially benzene, is significantly reduced.

In an alternative embodiment of the present invention, the air-cooled condenser is connected in series to a downstream shell-and-tube condenser prior to routing the non-equilibrium condensate to the gas/liquid contactor. The overall efficiency of the present system in controlling air pollution may thereby be improved whenever lower liquid coolant temperatures are available to the downstream shell and tube condenser.

The above description, as well as further objects, features and advantages of the present invention, will be more fully appreciated by reference to the following description and drawings.

DETAILED DESCRIPTION OF THE PREFERRED EMBODIMENTS

Figure 1:
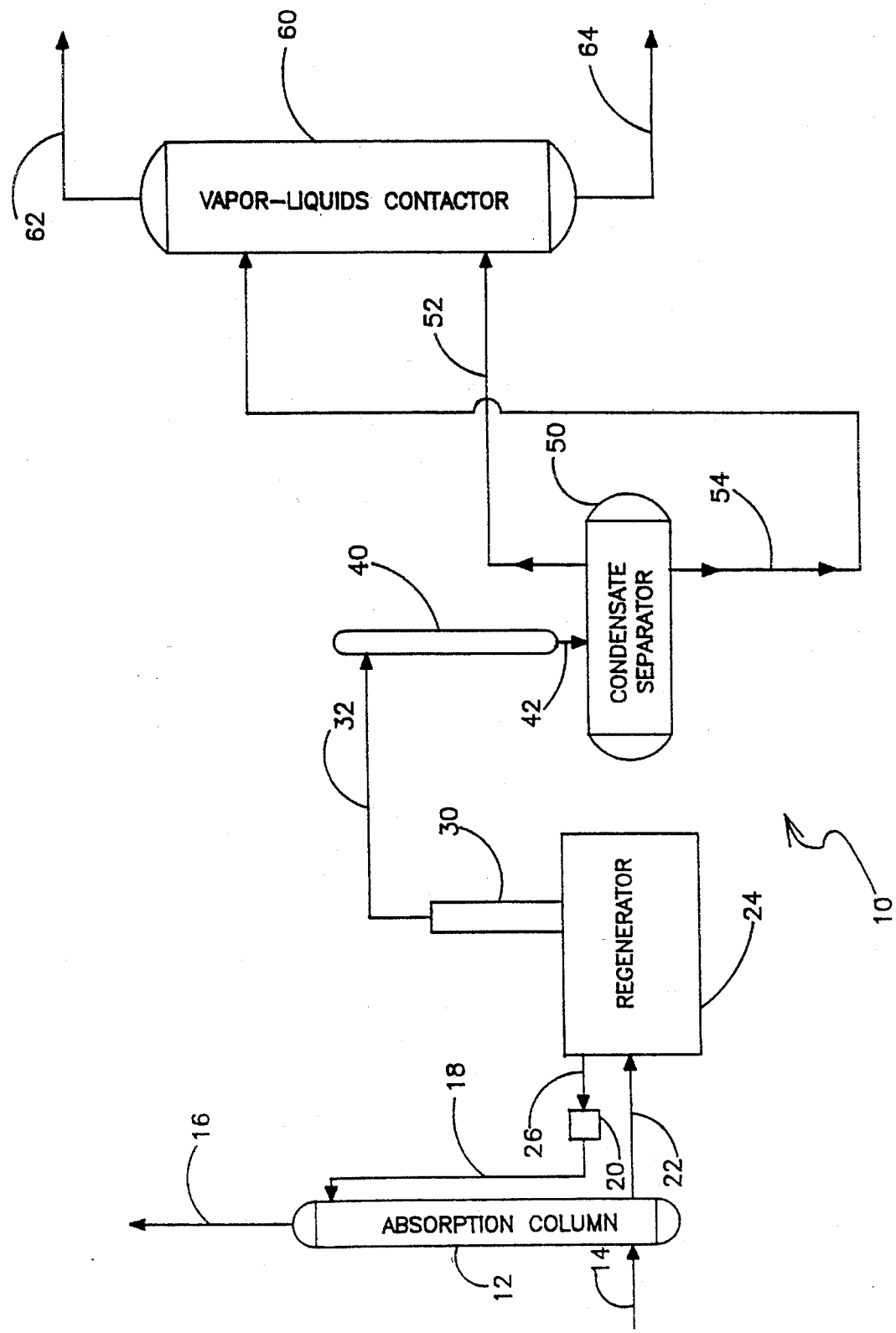
FIG. 1 is a schematic flow diagram illustrating a glycol regeneration system constructed in accordance with an embodiment of the present invention.

Referring to the accompanying drawings, FIG. 1 illustrates a glycol regeneration system 10 in which a wet gas stream is supplied to absorption column 12 via inlet line 14 and passes upwardly through and out the absorption column 12 via dried gas outlet line 16. Prior to introduction of the wet gas to the absorption column, it may be passed through an optional scrubber (not shown) which may be an integral part of column 12 or a separate unit.

A dry, lean glycol stream is continuously charged to the upper section of absorption column 12 via line 18 by circulating pump 20. Diethylene and triethylene are the principle glycols used for gas dehydration, although diethylene glycol and glycol mixtures may also be used. In the absorption column, the upwardly flowing gas passes through a packed bed or series of trays filled with glycol where intimate contact with the gas takes place.

A wet glycol stream laden with water containing volatile hydrocarbons is removed from the lower portion of absorption column 12 and passed via line 22 to a regenerator or reboiler 24. The regenerator 24 is heated above the boiling point of water to separate the glycol and water by distillation. The regenerator may be equipped with a firebox (not shown) using a portion of the dehydrated gas as fuel. A dehydrated glycol stream is discharged through a line 26 to pump 20 which pumps it to absorption column 12 via line 18. Typically, the dehydrated glycol stream is cooled in a cooler (not shown) before being returned to the absorption column.

Figure 2:
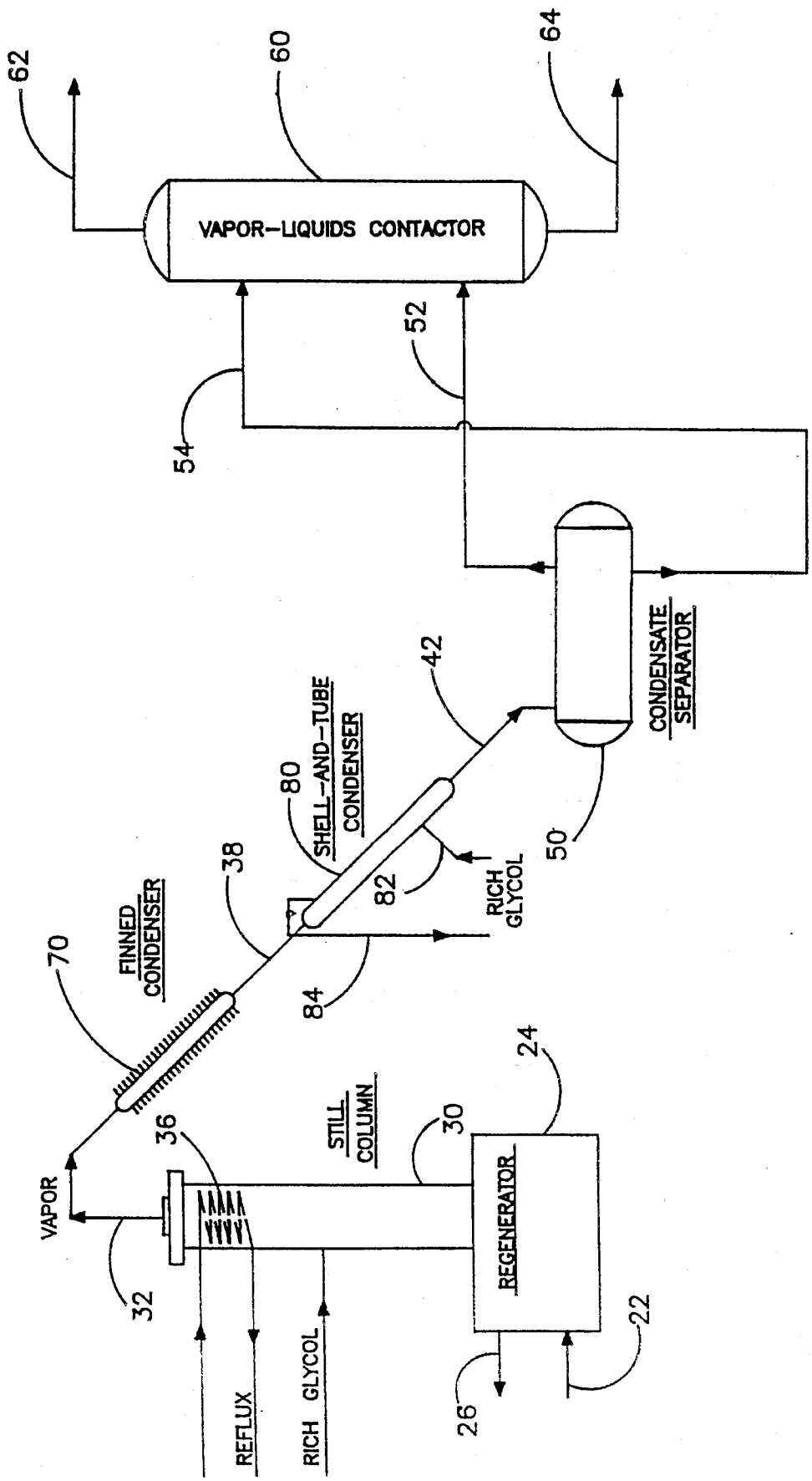
FIG. 2 is a sectional view of a glycol regeneration system constructed in accordance with an alternative embodiment of the present invention.
Figure 3:
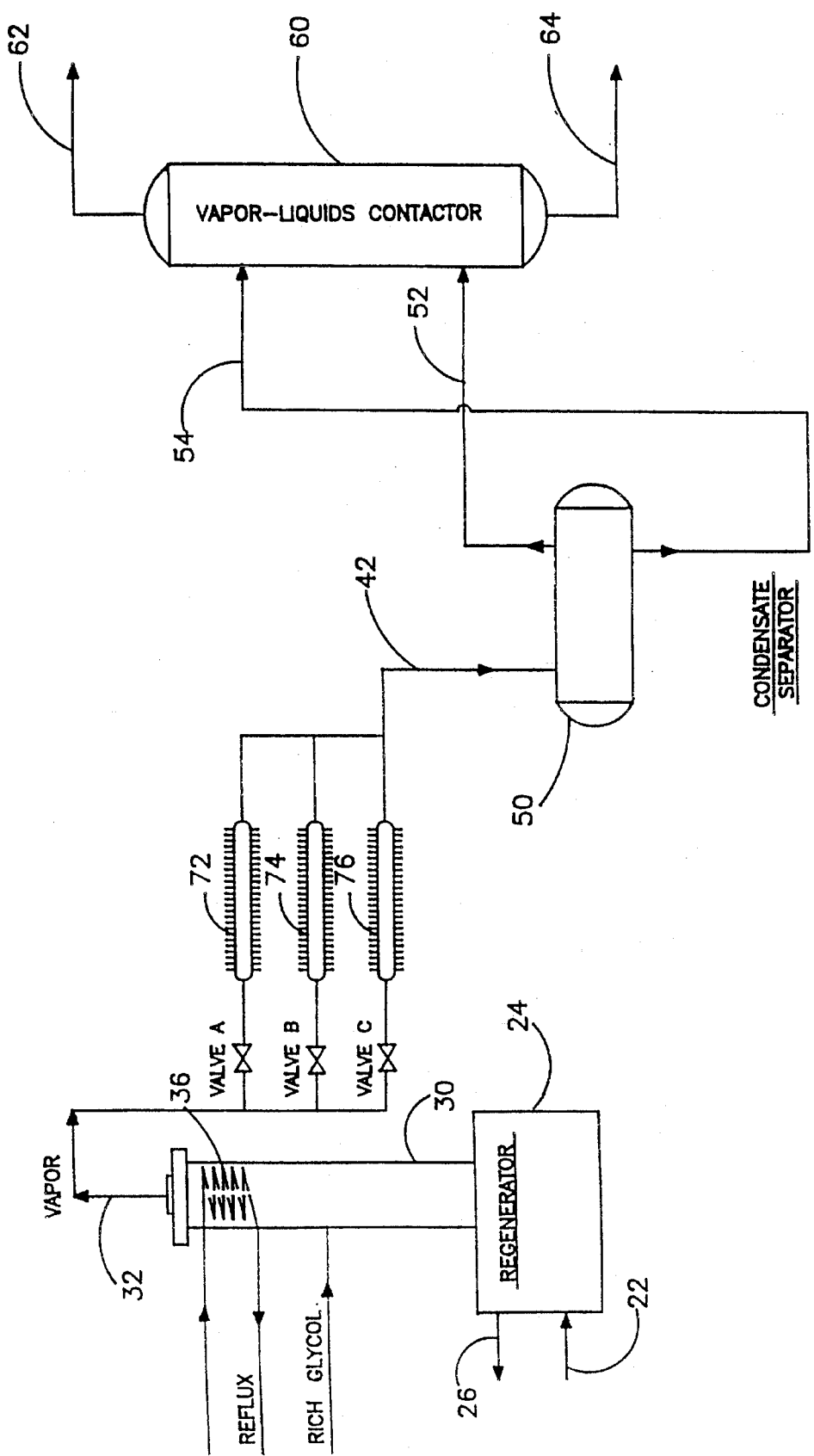
FIG. 3 is a sectional view of a glycol regeneration system illustrating a preferred fined condenser arrangement in accordance with another embodiment of the present invention.

On top of reboiler 24, and in communication therewith, is a still column 30. Liquid vapor rises from the reboiler through the still column and glycol vapors which coalesce drop back down into the reboiler and is there concentrated by heating. Most such reboilers use a heat exchanger 36 as shown in FIGS. 2 and 3, which is at the top of stripping still column 30 to cool the rising vapors and provide reflux liquid for the still column. As previously indicated, such glycol regeneration units and their operation are well known in the prior art and do not form a part of the present invention.

Water vapor and aromatic hydrocarbon vapors (BTEX) along with other VOC's are then passed via vent line 32 to a condenser 40, where they are condensed and passed as liquids and uncondensed gas via line 42 to a two-phase condensate separator 50. From separator 50, a gas phase is separated through line 52, and a mixture of water and liquid organic condensate is drawn off through line 54.

The invention vapor-liquids contactor is indicated at 60. The gas-liquid contactor 60 is operated under near ambient conditions and preferably consists of a relatively small diameter tower or column containing Raschig rings or other commercially suitable packing material to provide intimate contact between the gas and liquid phases. Contactor 60 may also include a tray column or a baffle column shaped in any convenient configuration.

A stream of the organic liquids and water is passed via line 54 to the top of the packed contactor 60 and allowed to descend in counter-current relation to the upward moving gas introduced at the bottom portion of the contactor via line 52. Desirably, vapor-liquids contactor 60 may be positioned relative to two-phase condensate separator 50 such that the liquid stream via line 54 is allowed to flow by gravity to contactor 60. Alternatively, a pump (not shown) connected to line 54 may be used to continuously charge liquid condensate to the upper section of contactor 60, where the liquid can be sprayed into the upward moving vapor to achieve intimate mixing. Condensed liquids having a relatively high content of readily recoverable organics exit line 64, while residual vapor having reduced organic emissions can be directly emitted to the atmosphere via line 62.

In FIG. 2, an alternative condenser arrangement in accordance with an embodiment of the present invention, is illustrated. This condenser arrangement includes a finned condenser 70 connected in series to a downstream shell-and-tube condenser 80. Vapors from still column 30 are passed via vent line 32 directly to finned condenser 70, where they are condensed and passed as liquids and uncondensed gas via line 38 to shell-and-tube condenser 80. Condenser 70 is a finned pipe which is cooled by natural circulation of ambient air. The air-cooled finned condenser 70 has a diameter of from about ¾ to 3 inches, preferably 2 inches, and its length may vary depending on the vent flow. Shell-and-tube condenser 80 is specifically described in aforementioned U.S. Pat. No. 5,141,536, which is incorporated herein by reference. The shell-and-tube condenser has an interior tube with an inlet and outlet connected to lines 38 and 42, respectively, for passage of the vapor and liquids, and a shell having an inlet 82 and outlet 84 for passage of rich glycol through an annular space between the shell and tube. Shell outlet 84 can be in fluid communication with rich glycol being refluxed in still column 30, and inlet 84 may be in fluid communication with the rich glycol leaving absorption column 12 via line 22, for example. Both condensers 70 and 80 slope gradually downward to allow the condensed liquids to flow by gravity. Liquids and any uncondensed gas exiting condenser 80 is passed via line 42 to a two-phase condensate separator 50, then routed to contactor 60, where the condensed liquids and vapor are intimately contacted as described hereinabove.

FIG. 3 illustrates another embodiment of the present invention, wherein the condenser arrangement is a parallel array of finned condensers 72, 74 and 76. The flow to finned condensers 72, 74 and 76 via line 32 is controlled by valves A, B and C, respectively, to provide for varying ambient air temperatures. For instance, when the air temperature is hot, as usually occurs in southern gas fields of the United States, the flow rate of water and hydrocarbon vapors requires the entire condenser array to sufficiently condense the vapors exiting still column 30. Under high ambient temperature conditions, valves A, B and C are opened to allow gaseous fluids to be split into three paths and separately flow through finned condensers 72, 74 and 76. In moderately sub-freezing weather occurring occasionally from November to March, valve A can be closed, and both valves A and B should be closed during frigid weather (January-February). These actions can prevent condensed water from freezing while maintaining condenser performance. The length of each finned condenser may vary between 10 and 100 feet, typically between 20 and 40 feet, and its diameter is between 1 and 3 inches, preferably 2 inches.

The liquid hydrocarbons recovered from line 64 are commercially valuable materials, which may be readily marketed. Therefore, the present invention not only eliminates undesirable environmental pollutants, but provides for additional marketable products. The extra recovered products should pay over the long term for any investment in a new installation constructed in accordance with the present invention. Alternatively, the cost of retrofitting the invention vapor-liquids contactor 60 to an existing glycol dehydration unit condenser may be only a few hundred dollars, which can be readily offset by increased hydrocarbon values.

It has been estimated that approximately 40,000 glycol dehydration units are in operation in the U.S. Given that the average annual uncontrolled emissions to be 12.5 tons of VOC's per unit, the resulting 500,000 tons per year of these emissions merits the current EPA concern and action. The present control system provides an overall, annual VOC control efficiency of up to 98%. An air-cooled condenser alone will leave an annual minimum of about 5% of the incoming VOC's uncontrolled, whereas the present system can reduce those uncontrolled emissions to approximately 2%. The reduction of benzene is especially significant, given benzene's known toxicity.

The following Table I shows how the vapor-liquids contactor of the present invention may affect VOC and BTEX emissions nationwide based on varying emissions control efficiencies of conventional glycol dehydration condensers:

TABLE I

| Conventional Condenser Emissions | | Present Invention | |
|---|---|---|---|
| Recovery (Percent) | Emitted (Tons/Year) | Recovery (Percent) | Emitted (Tons/Year) |
| 90 | 50,000 | 95 | 25,000 |
| 95 | 25,000 | 97.5 | 12,500 |
| 96 | 20,000 | 98 | 10,000 |

The effectiveness of the present invention is further illustrated in Table II. The data of Table II sets forth a comparative experimental simulation of uncontrolled and controlled emissions of VOC's and hazardous air pollutants (HAP's) from (1) the vapor vent of a conventional glycol reboiler, (2) the exit stream from the condenser, and (3) the exits streams from the vapors-liquids contactor of the present invention. It is well known that the uncontrolled vapor streams emitted from glycol dehydrators vary widely in composition and flow rate. The composition depends upon the origin of the natural gas stream being treated, and the flow rate depends both on the natural gas stream's composition, pressure and temperature and on the amount of natural gas being treated. The following corresponds to a medium size glycol dehydrator treating a stream moderately rich in xylene:

TABLE II

| COMPONENT Tons/Year | EXIT (1) | EXIT (2) | EXIT (3) | *CONDENSER ONLY | *CONDENSER + CONTACTOR |
|---|---|---|---|---|---|
| Methane | 0.4278 | 0.4256 | 0.4178 | 99.49% | 97.67% |
| Ethane | 0.3139 | 0.3079 | 0.2771 | 98.07% | 88.28% |
| Propane | 1.0409 | 0.9786 | 0.7205 | 94.01% | 69.22% |
| Butanes | 0.8422 | 0.7049 | 0.3399 | 83.70% | 40.36% |
| Pentanes | 3.1189 | 1.8887 | 0.5590 | 60.56% | 17.92% |
| Hexanes | 8.2993 | 2.1004 | 0.5537 | 25.31% | 6.67% |
| Heptanes | 3.9775 | 0.1256 | 0.0957 | 3.16% | 2.41% |

TABLE II-continued

| COMPONENT Tons/Year | EXIT (1) | EXIT (2) | EXIT (3) | *CONDENSER ONLY | *CONDENSER + CONTACTOR |
|---|---|---|---|---|---|
| Octanes | 0.4088 | 0.0000 | 0.0035 | 0.00% | 0.85% |
| n-Hexane | 0.5854 | 0.1482 | 0.0391 | 25.31% | 6.67% |
| Benzene | 1.3410 | 0.2317 | 0.0624 | 17.27% | 4.65% |
| Toluene | 6.1962 | 0.0593 | 0.0935 | 0.96% | 1.51% |
| Xylenes | 23.5769 | 0.0004 | 0.1147 | 0.00% | 0.49% |
| TOTAL VOC's | 49.3871 | 6.2378 | 2.5820 | 12.63% | 5.23% |
| TOTAL HAP's | 31.6995 | 0.4396 | 0.3097 | 1.39% | 0.98% |

*Percent (%) of inlet emitted

From the above data, the total VOC's recovered by the present invention amounts to 47 tons per year, or 361 barrels per year. The value of recovered hydrocarbons at $19 per barrel amounts to $6,860 per year. Note that the contactor has reduced the benzene emissions by a factor of four.

It is to be understood that the present invention is not limited to the exemplary embodiments described above. It will be apparent to those skilled in the art that various modifications and variations are possible within the spirit and scope of the present invention. The present invention encompasses any and all embodiments within the scope of the claims appended hereto.

I claim:

1. In a method for reducing emissions of volatile organic compounds and hazardous air pollutants from glycol dehydration units for drying natural gas comprising:

flowing vented water vapor and volatile hydrocarbons from a glycol regenerator to a finned condenser to obtain a stream containing uncondensed vapors, water and an organic liquid;

passing said stream to a two-phase condensate separator to provide a separate stream of uncondensed vapors and a separate stream of liquids; and passing said stream of liquids through a contactor in counter-current relation to said stream of uncondensed vapors, whereby condensed liquids containing a relatively high content of hydrocarbons is recovered from the bottom of the contactor, and vapors having a reduced content of organic emissions is release to the atmosphere from the top the contactor.

2. The method according to claim 1, wherein said contactor is operated under ambient conditions.

3. The method according to claim 1, wherein said stream of liquids is allowed to descend through the contactor by gravity.

4. The method according to claim 1, wherein said stream of liquids is continuously sprayed from an upper section of the contactor.

5. In a glycol dehydration system for drying natural gas including an absorption column for contacting glycol and wet gas, a glycol regenerator having a vapor vent, and pump means for moving the glycol through the system, the improvement comprising:

a finned condenser to condense steam and gaseous hydrocarbons from the vapor vent of the glycol regenerator, said finned condenser including an outlet;

a two-phase condensate separator communicating with said outlet for separating liquids and uncondensed vapors exiting said finned condenser, said condensate separator having a vapor outlet and liquid outlet; and a vapor-liquids contactor in communication with said vapor outlet and said liquid outlet for passing said liquids in counter-current relation to said vapors.

6. The system according to claim 5, wherein said vapor-liquids contactor is a relatively small diameter column containing packing material to provide intimate contact between said vapors and liquids.

7. The system according to claim 5, including means for transporting said liquids to a top section of said vapor-liquids contactor, and means for introducing said vapors to a bottom portion of said contactor.

8. The system according to claim 7, wherein said vapor-liquids contactor includes a top outlet for releasing vapors having a reduced content of organic emissions to the atmosphere.

9. The system according to claim 7, wherein said vapor-liquids contactor includes a bottom outlet for recovering condensed liquids containing a relatively high content of hydrocarbons.

10. The system according to claim 5, wherein said finned condenser is a helically finned pipe which is cooled by natural circulation of ambient air.

11. The system according to claim 5, wherein said finned condenser is connected in series to a downstream shell-and-tube condenser.

12. The system according to claim 5, wherein said finned condenser includes a parallel arrangement of plural finned condensers.

* * * * *